UNITED STATES PATENT OFFICE.

LUDWIG LANDSBERG, OF NUREMBERG, GERMANY.

PROCESS FOR THE MANUFACTURE OF ASPHALT-LIKE MASSES AND DERIVATIVES THEREFROM.

1,211,721.     Specification of Letters Patent.     Patented Jan. 9, 1917.

No Drawing.     Application filed April 28, 1913. Serial No. 764,121.

*To all whom it may concern:*

Be it known that I, LUDWIG LANDSBERG, chemist, a subject of the German Emperor, and residing at Nuremberg, in the Kingdom of Bavaria, Germany, have invented certain new and useful Improvements in Processes for the Manufacture of Asphalt-like Masses and Derivatives Therefrom, of which the following is a specification.

The present invention has for its object the production of asphalt-like masses which can be employed for the most diverse technical purposes.

The process consists essentially in the treatment of the so-called sludge or acid resins produced as by-products in the refining of heavy mineral oils with sulfuric acid, with such a quantity of a solvent as is sufficient to dissolve the oils still contained in the acid resins or sludge, until a resin residuum remains which is soluble in water after the elimination of the sulfuric acid contained in it by treatment with water.

Benzin and the like aliphatic hydrocarbons are particularly suitable solvents for use in the present process. The treatment of the resin residuum with water must be continued until the sulfuric acid is entirely or almost entirely eliminated.

The invention is carried into practice in the following manner: Acid resins, such for example as arise in the refining of Galician or Roumanian mineral oils or of lubricating oils are mixed with benzin or similarly acting solvents that dissolve oils and the like but which do not absorb asphalt and asphalt-like substances or only to an inconsiderable extent. The mass is then separated in an appropriate manner from the solution for example by filtration or suction. The oil that was still present in the acid resins and now dissolved can then be recovered by distillation of the solvents from the separate solution.

Oils are obtained in varying quantities according to the nature of the acid resins (but in any case in considerable amounts) which by a refining process can be converted into a utilizable commercial product. The resin residuum remaining after the separation of the solution represents a mass that is somewhat solid at ordinary temperatures. This mass is agitated with water until the sulfuric acid contained therein is dissolved. The liquid is then separated from the mass, for example by filtration or suction and the sulfuric acid can be recovered by concentrating the solution.

The asphalt like substances freed from the dilute sulfuric acid present the property of dissolving almost completely in water. From this solution they can again be separated by adding an excess of suitable metal combinations such for example as common salt, ammonium chlorid and other salts, or dilute acids. These precipitates dissolve in water. If metal combinations as salts of the alkaline earths be added to the solution of the asphalt-like substances in water or magnesium and aluminium salts or the like, or salts of other metals, such for example as salts of copper, nickel, iron, zinc, lead or hydroxids, or oxids, for example milk of lime, barium hydroxid, alumina and so forth, such metal combinations form precipitates insoluble in water. The concentrated aqueous solutions of the asphalt-like substances or their precipitates with sodium chlorid and the like, present the property of taking up in suspension certain substances such for example as petroleum residues, tar, creosote and the like, so that emulsion-like solutions are formed. If these emulsion-like solutions are mixed with metallic salts, such for example as calcium chlorid, sulfate of copper or the like, the said added substances separate simultaneously with the precipitates insoluble in water already referred to and are homogeneous masses with the asphalts. All these precipitates form asphalt-like masses which, when dried, are solid, readily pulverizable materials.

The process can also be carried into practice by first of all treating the original acid resins or sludge with water for eliminating the sulfuric acid as far as possible, filtering the liquid and then agitating the residual masses with benzin or an analogous solvent.

Another method of carrying the process into practice is to mix the original acid resins with water and benzin or a solvent exerting a similar action simultaneously. The whole of the liquid is then filtered off and the benzin solution containing the oil is separated from the water containing the sulfuric acid. The resin soluble in water remains behind on the filter.

The raw material employed in the process, instead of being the acid resins which are formed when sulfuric acid is used in refining heavy mineral oils, may be other acid resins, such for example as the acid tars produced in the preparation of other organic products.

Example I: 10 kg. of acid resin or petroleum sludge are thoroughly mixed with 5 kg. of benzin (specific gravity approximately 0.720) for some hours in an apparatus provided with appropriate agitator mechanism. The benzin solution is then separated from the resin by filtration or suction and distilled and then after the benzin has been distilled over the extracted oil which was still contained in the acid resin is recovered. The quantity of oil obtained amounts to about 2 kg. This oil is then refined in the known manner to form lubricating oil. The resin, freed from benzin, is then mixed with water until the sulfuric acid has dissolved. Concentrated sulfuric acid is obtained by concentrating the dilute sulfuric acid distilled over. The resin freed from the acid is then dissolved in water and this solution is then precipitated with common salt. The whole of the dissolved resin is precipitated in this operation. This resin is filtered off and by drying it in the water bath a solid, readily pulverizable substance is obtained. The quantity of this substance obtained amounts to about 4.5 kg.

Example II: 10 kg. of acid resin (arising from the refining of lubricating oil from crude Galician petroleum) were intimately mixed for some hours with 5 kg. of water and 5 kg. of benzin (specific gravity approximately 0.740). Then the whole of the liquid was separated from the precipitated resin by filtration or suction. The aqueous solution and the benzin solution were separated one from the other and both these solutions and the residual resin were further treated in the manner described in Example I. In addition to the sulfuric acid recovered, the following were obtained in the present case: 1.8 kg. of oil, and 4.8 kg. of dry resin soluble in water.

The property presented by the asphalt-like masses obtained by the process in accordance with the present invention, of dissolving in water and of being again separable by means of appropriate precipitants in a form insoluble in water, and furthermore the property of the concentrated aqueous solution of taking up petroleum residues, tar, creosote and the like in suspension, which additions can be precipitated by means of appropriate precipitants with the asphalt-like masses as homogeneous masses, renders it suitable for a large number of technical purposes. Thus, for example these masses can be employed with great advantage as dust binding substances. Road material is mixed with the aqueous asphalt solution, the material is then rolled in and over it is poured a solution of calcium chlorid or magnesium chlorid or milk of lime. These precipitating solutions can also be added to the road material prior to the rolling after the road material has been mixed with the aqueous asphalt solution.

Another method of employing asphalt-like masses produced in the manner described above, is the impregnation of wood, roofing pasteboard and the like. The material to be impregnated (wood for example) is either first of all impregnated with asphalt solution and then with a precipitant such as calcium chlorid, chlorid of zinc, copper salts and the like, or it may first be treated with the precipitant and then with the asphalt solution.

It has been found that the asphalt-like masses prepared in accordance with the present invention and which present the character of a sulfo-acid, or the soluble or insoluble deposits or precipitates produced from these masses when mixed with oxygen - yielding substances furnish products which ignite and explode readily. For example the precipitation of the aqueous solution of an asphalt-like mass in accordance with the invention with common salt—after drying—furnishes with potassium chlorate a mixture which explodes by percussion or on contact with an incandescent wire.

The mixing of the precipitates in accordance with the present invention with the oxygen-yielding substances such as for example chlorates, saltpeter, peroxids and so forth, can either be effected mechanically, or, in so far as the constituents of the mixture are soluble, it can take place by dissolving these two constituents and subsequently vaporizing the mixture of the dissolution. The usual solvent is water, but it will of course be understood that in some circumstances other solvents can be employed.

The great advantage presented by the products manufactured by mixing the asphalt-like masses or their precipitates with oxygen-yielding bodies resides in the fact that without its being necessary for them to contain nitro groups, they present properties which render it possible for them to be employed as explosives, kindling masses and so forth. Furthermore if an asphalt manufactured in accordance with the present invention or its salts or precipitates be treated with concentrated nitric acid or with nitro-sulfuric acid or with glacial acetic acid and nitric acid or with other acid bodies or compounds that exert a nitrating action, yellow to brown-red solid substances are formed.

Example III: 1 part of the asphalt soluble in water is introduced into three parts of nitric acid of a specific gravity of 1.50 cooling being effected during this introduction. When this introduction is finished the mixture is heated for some time to approximately 50° C. and then introduced into cold water. A red body then separates out and this is filtered and washed. The mass thus obtained is insoluble in water, even hot water, but is readily soluble in dilute soda solution, in lyes and the like. From the soda solution, which is of a deep brown-red the insoluble material is again separated upon the addition of acids. The resultant product therefore presents the properties of an acid and consequently forms salts with metals.

In the method of treating the asphalt soluble in water described above with substances exerting a nitrating action in some circumstances a substance soluble in water is also formed and is contained in the acid filtrate (after the precipitation with water.) From this filtrate the substance can be precipitated by the addition of common salt (in the form of its sodium salt) as a yellow-colored body and by the addition of other metallic salts the corresponding metallic salts are obtained.

The nitrated products which can be produced in accordance with the present invention form when in a dry state and when intimately mixed with saltpeter, potassium chlorate or the like, readily detonating masses. When heated alone, they burn with a considerable increase of volume. They can be employed for diverse technical purposes, *inter alia* when mixed with oxygen-yielding bodies for forming kindling and explosive substances.

In the dry distillation of the precipitates and deposits that can be produced from the asphalt-like masses by the addition of appropriate precipitants, oils are formed which present a more or less viscous nature and distil *in vacuo* without considerable decomposition. These oils can be employed for various technical purposes.

The solutions of the asphalt-like masses in water, as stated above furnish, when metallic salts such as those of copper, nickel, or iron are added, precipitates or salts insoluble or only soluble with difficulty in water. When heated these precipitates supply large quantities of gases and condensable oils, if the heating be carried out in the absence of air the metal contained therein remains behind in metallic form very finely divided, while if the air be not excluded, metallic oxid forms in a finely divided state. If a mixture composed of precipitates of various metals is employed corresponding mixtures of metals or metallic oxids can be obtained. Finally the process can also be carried into practice by impregnating a porous body such as animal charcoal, pumice-stone or the like with the aqueous solution of an asphalt-like mass in accordance with the invention, then treating it with a solution of a metallic salt and then heating the body containing the insoluble salt. It is of course also possible to impregnate the porous body with the metallic salt solution in the first place and then treat it with the aqueous solution of the asphalt-like mass.

When the metallic precipitates are heated there are formed simultaneously with the metals or metallic oxids and the gases evolved condensable oils which correspond to those formed during the dry distillation of the precipitates obtainable from the asphalt-like masses. Metals or metallic oxids in a finely divided state are also obtained, when, in place of the metallic precipitates obtainable from the water-soluble asphalt-like mass, precipitates are heated which are formed when the metallic salts are added to the water-soluble nitrated products soluble in water of the asphalt-like masses. Accordingly it is possible to employ both the products soluble in water and also the nitrated products insoluble in water obtainable in accordance with the invention as the primary materials for the metallic precipitates to be heated, the nitrated products insoluble in water being dissolved in dilute soda solution or the like prior to the precipitation with metallic salts.

The decomposition or combustion of all the metallic precipitates referred to above to form metals or metallic oxids is facilitated if they are mixed with certain oxygen-yielding substances; nitrates are advantageous for this purpose.

The oils formed in the dry distillation of the precipitates obtainable from the asphalt-like masses or in the heating of the metallic precipitates, when treated with nitrating agents such as nitric acid, nitro sulfuric acid, glacial acetic acid and nitric acid, or with other acid bodies compounds or mixtures that also exert a nitrating action, form solid bodies of a yellow to red color, which are readily pulverizable and insoluble in water.

In carrying this process into practice, the oils (eventually mixed with sulfuric acid, glacial acetic acid or the like) are introduced into strong nitric acid or into nitro sulfuric acid or into other nitrating mixtures while cooling and agitating. When this introduction is finished the mixture is allowed to stand for some time at normal temperature or even heated somewhat, if it is necessary for completing the reaction. When the reaction mixture is introduced into cold water, the products of the nitration separate in solid form. They are then filtered, thoroughly washed and dried.

Example IV: 1 part of the oils formed in the dry distillation of the soluble or insoluble precipitates referred to above, is introduced into 2 parts of concentrated sulfuric acid at approximately 50° Baumé while vigorously cooling; then, while still cooling, 4 parts of concentrated sulfuric acid are added. When the reaction is finished the mixture is poured onto ice, and the novel product separates out as a yellow, solid body. This is filtered, thoroughly washed and dried. For 1 part by weight of the oil which in the present case is used as the primary material, 1.3 parts by weight of the novel product is obtained. The substances obtained in this manner are quickly consumed when heated and can be employed for various technical purposes. The products obtainable by mixing them with substances readily yielding oxygen, such for example as saltpeter, chlorates, peroxids and the like can readily be exploded in contact with igniting means and can therefore be used, *inter alia* as explosives, kindling masses and so forth.

The oils formed in the dry distillation of precipitates obtainable from the asphalt-like masses or in the heating of the metallic precipitates that takes place in forming finely divided metals and the like, can also be subjected to the following further treatment. If these oils mixed with finely divided sulfur such as sublimated sulfur are heated in the presence of catalytic substances, such for example as chlorid of sulfur, copper powder, cupric oxid, mercuric oxid for some hours at temperatures of approximately 170° to 180° C., solid or almost solid substances are obtained which contain the sulfur in combination. The substance added as catalytic agent (unless it is chlorid of sulfur) can then be separated by boiling with chloroform or similar solvents, and after the solvent has been distilled over the sulfurized substance remains behind. It is insoluble in water. By heating with concentrated sulfuric acid the substance can only be converted into the soluble form with difficulty. In the case of sulfuric acid containing anhydrids (for example with 20% fuming sulfuric acid) this takes place on heating to 90° to 100° C. When the sulfuration is finished, the sulfuric acid in excess is separated by introducing the substance into water (the sulfated product is soluble with difficulty in moderately dilute sulfuric acid, but is soluble in water) and then by precipitating the aqueous solutions with common salt or other appropriate precipitants, the sulfo acid of the sulfated substances is obtained in a form soluble in water.

The sulfurous masses produced in accordance with the processes described above can be used for technical and pharmaceutical purposes, or subjected to additional treatment for such purposes. Thus, for example, sulfur ointments, soaps and the like can be formed therefrom, by grinding or mixing them with appropriate fats or emulsion, suspension or solvent media.

I claim herein as my invention:

1. The process which comprises removing from the acid resins or sludge resulting from the refining of heavy mineral oils with sulfuric acid, the oils still contained therein and the sulfuric acid, until the solid asphalt-like masses become water-soluble masses.

2. The process which comprises subjecting the acid resins or sludge resulting from the refining of heavy mineral oils with sulfuric acid, to the action of an aliphatic solvent for the remaining oils and a solvent for the remaining sulfuric acid, thereby obtaining solid water-soluble asphalt-like bodies.

3. The process, which comprises subjecting the acid resins or sludge resulting from the refining of heavy mineral oils with sulfuric acid, to the action of benzin in quantity sufficient to lixiviate the oils remaining in said sludge, and with water sufficient to remove the residual sulfuric acid, thereby obtaining water-soluble asphalt-like bodies.

4. The process, which comprises subjecting the acid resins or sludge resulting from the refining of heavy mineral oils with sulfuric acid, to the simultaneous action of an aliphatic solvent sufficient to lixiviate the oils remaining in the sludge, and a solvent sufficient to lixiviate the sulfuric acid in said sludge, thereby obtaining a solid residue of water-soluble, asphalt-like masses.

5. The process, which comprises removing from the acid resins or sludge, resulting from the refining of heavy mineral oils with sulfuric acid, the residual oil and the sulfuric acid content, to leave water-soluble asphalt-like masses, and precipitating said masses from their aqueous solution by means of a metal combination capable of precipitating them.

6. The process which comprises removing from the acid resins or sludge, resulting from the refining of heavy mineral oils with sulfuric acid, the residual oil and the sulfuric acid content, to leave water-soluble, asphalt-like masses, and precipitating said masses from their aqueous solution by means of a metallic salt capable of precipitating them.

7. The process, which comprises removing from the acid resins or sludge resulting from the refining of heavy mineral oils with sulfuric acid, the residual oil and the sulfuric acid content to leave water-soluble, asphalt-like bodies, forming an emulsion of an aqueous solution of said bodies and petroleum residues, and precipitating said bodies and residues as homogeneous masses.

8. The process, which comprises removing from the acid resins or sludge resulting from the refining of heavy mineral oils with sulfuric acid, the residual oil and the sulfuric acid content, to leave water-soluble, asphalt-like bodies, forming an emulsion of an aqueous solution of said bodies and petroleum residues, and reacting on the emulsion with metallic salts to produce a homogeneous precipitate.

9. The process, which comprises removing from the acid resins or sludge resulting from the refining of heavy mineral oils with sulfuric acid, the residual oil and sulfuric acid content, to leave water-soluble, asphalt-like bodies, forming an emulsion of an aqueous solution of said bodies and tar, and precipitating said bodies and residues as homogeneous masses.

10. The process, which comprises removing from the acid residues or sludge resulting from the refining of heavy mineral oils with sulfuric acid, the residual oil and the sulfuric acid content, to leave water-soluble asphalt-like bodies, forming an emulsion of an aqueous solution of said bodies and tar, and reacting on the emulsion with metallic salts to produce a homogeneous precipitate.

11. The process, which comprises removing from the acid residues or sludge resulting from the refining of heavy mineral oils with sulfuric acid, the residual oil by means of a solvent thereof and the acid content by water, to leave water-soluble, asphalt-like bodies, emulsifying a concentrated aqueous solution of said bodies with petroleum residues, and reacting on the emulsion with a salt capable of precipitating homogeneous masses including said bodies in insoluble form.

12. The process, which comprises removing from the acid residues or sludge resulting from the refining of heavy mineral oils with sulfuric acid, the residual oil and the sulfuric acid content, to leave water-soluble, asphalt-like bodies, forming an emulsion of an aqueous solution of said bodies and creosote, and precipitating said bodies and residues as homogeneous masses.

13. The process, which comprises removing from the acid resins or sludge resulting from the refining of heavy mineral oils with sulfuric acid, the residual oil and the sulfuric acid content, to leave water-soluble, asphalt-like bodies, forming an emulsion of an aqueous solution of said bodies and creosote, and reacting on the emulsion with metallic salts to produce a homogeneous precipitate.

14. The process, which comprises removing from the acid residues or sludge resulting from the refining of heavy mineral oils with sulfuric acid, the residual oil by means of a solvent thereof and the acid content by water, to leave water-soluble, asphalt-like bodies, emulsifying a concentrated aqueous solution of said bodies with tar, and reacting on the emulsion with a salt capable of precipitating homogeneous masses including said bodies in insoluble form.

15. The process, which comprises removing from the acid residues or sludge resulting from the refining of heavy mineral oils with sulfuric acid, the residual oil by means of a solvent thereof and the acid content by water, to leave water-soluble, asphalt-like bodies, emulsifying a concentrated aqueous solution of said bodies with creosote, and reacting on the emulsion with a salt capable of precipitating homogeneous masses including said bodies in insoluble form.

16. A water-soluble asphalt-like substance, which is a solid readily pulverizable at ordinary temperatures, is precipitable from its aqueous solutions by salts of the metals as water-soluble precipitates; and by oxids and hydroxids as precipitates insoluble in water, and when nitrated burns freely.

In testimony whereof, I affix my signature in the presence of two witnesses.

LUDWIG LANDSBERG.

Witnesses:
OSCAR BOCK,
RALPH W. DOX.